United States Patent [19]

Miyagawa

[11] Patent Number: 5,488,489
[45] Date of Patent: Jan. 30, 1996

[54] IMAGE READ-OUT AND REPRODUCING APPARATUS

[75] Inventor: Ichirou Miyagawa, Kanagawa, Japan

[73] Assignee: Fuji Photo Film Co., Ltd., Kanagawa, Japan

[21] Appl. No.: 836,838

[22] Filed: Feb. 19, 1992

[30] Foreign Application Priority Data

Mar. 1, 1991 [JP] Japan ................................. 3-036097

[51] Int. Cl.$^6$ ................................................. H04N 1/04
[52] U.S. Cl. ........................... 358/474; 358/472; 358/481; 367/129
[58] Field of Search .................................. 358/401, 405, 358/496, 481, 408, 474, 475, 497, 493, 494, 451, 80, 471, 472, 480, 486; 346/106, 160

[56] References Cited

U.S. PATENT DOCUMENTS

| | | | |
|---|---|---|---|
| 4,750,045 | 6/1988 | Ohara | 358/481 |
| 4,789,782 | 12/1988 | Ohara | 250/327.2 |
| 4,827,355 | 5/1989 | Kotani et al. | 358/472 |
| 4,924,321 | 5/1990 | Miyagawa et al. | 358/296 |
| 5,040,074 | 8/1991 | Stemmele | 358/496 |
| 5,049,999 | 9/1991 | Stemmle | 358/296 |
| 5,070,410 | 12/1991 | Hadley | 358/472 |

Primary Examiner—Edward L. Coles, Sr.
Assistant Examiner—Jerome Grant, II
Attorney, Agent, or Firm—Sughrue, Mion, Zinn, Macpeak & Seas

[57] ABSTRACT

An image read-out and reproducing apparatus comprises a sub-scanning device for supporting an image storage sheet, on which image information has been recorded, and a recording material, on which an image is to be reproduced during its exposure to a light beam, such that the image storage sheet and the recording material may stand side by side with each other. The sub-scanning device conveys the image storage sheet and the recording material in the same direction or in directions opposite to each other. A single main scanning device causes a light beam to scan the image storage sheet and the recording material in a direction, which is approximately normal to the direction or directions along which the image storage sheet and the recording material are conveyed, and with a scanning width that covers both the image storage sheet and the recording material. A photoelectric detector detects light, which is radiated out of a portion of the image storage sheet exposed to the light beam, and an image signal representing the image information, which has been recorded on the image storage sheet, is thereby obtained. A light modulator modulates the light beam in accordance with a predetermined image signal while the light beam is scanning the recording material.

12 Claims, 3 Drawing Sheets

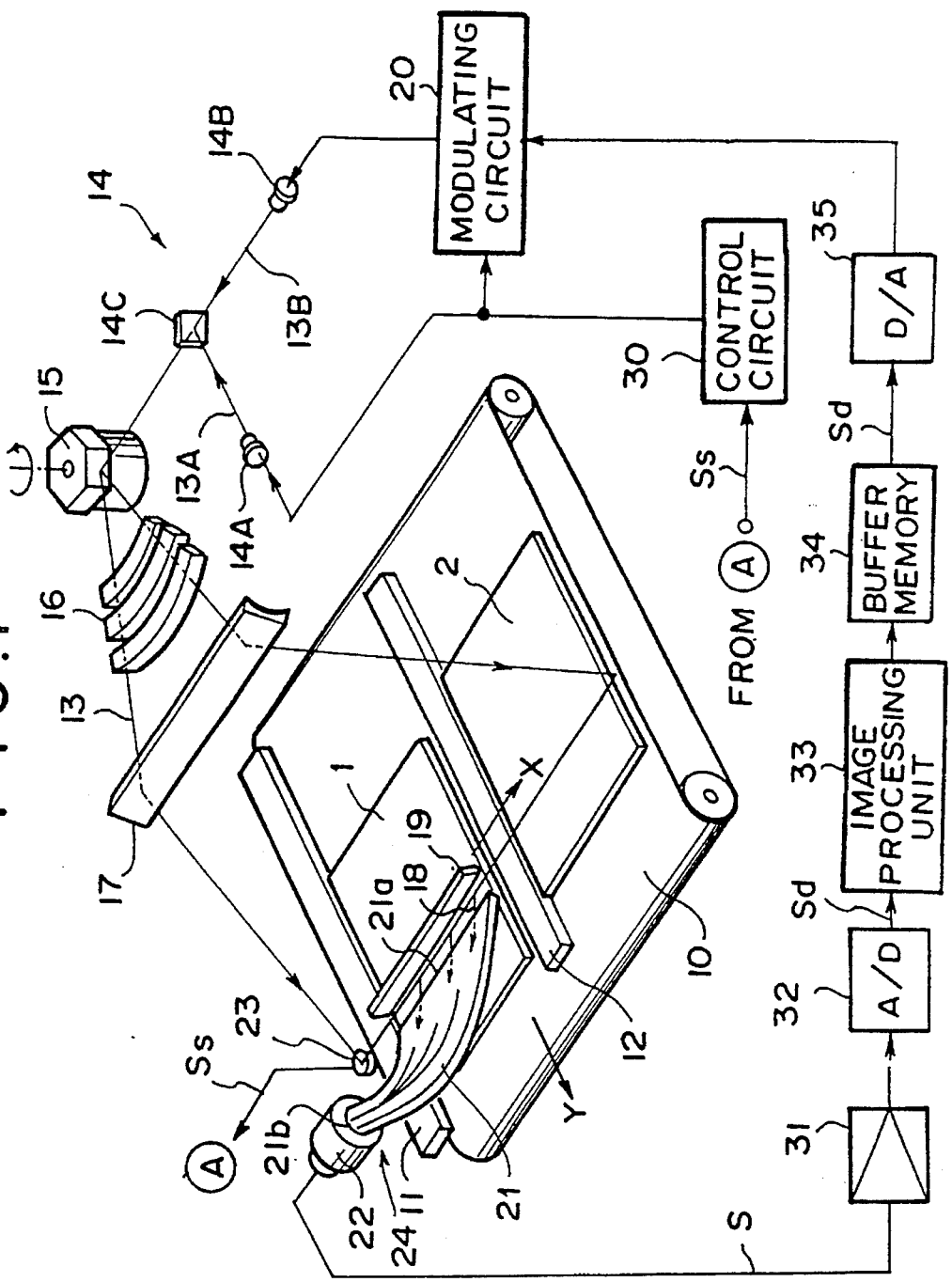

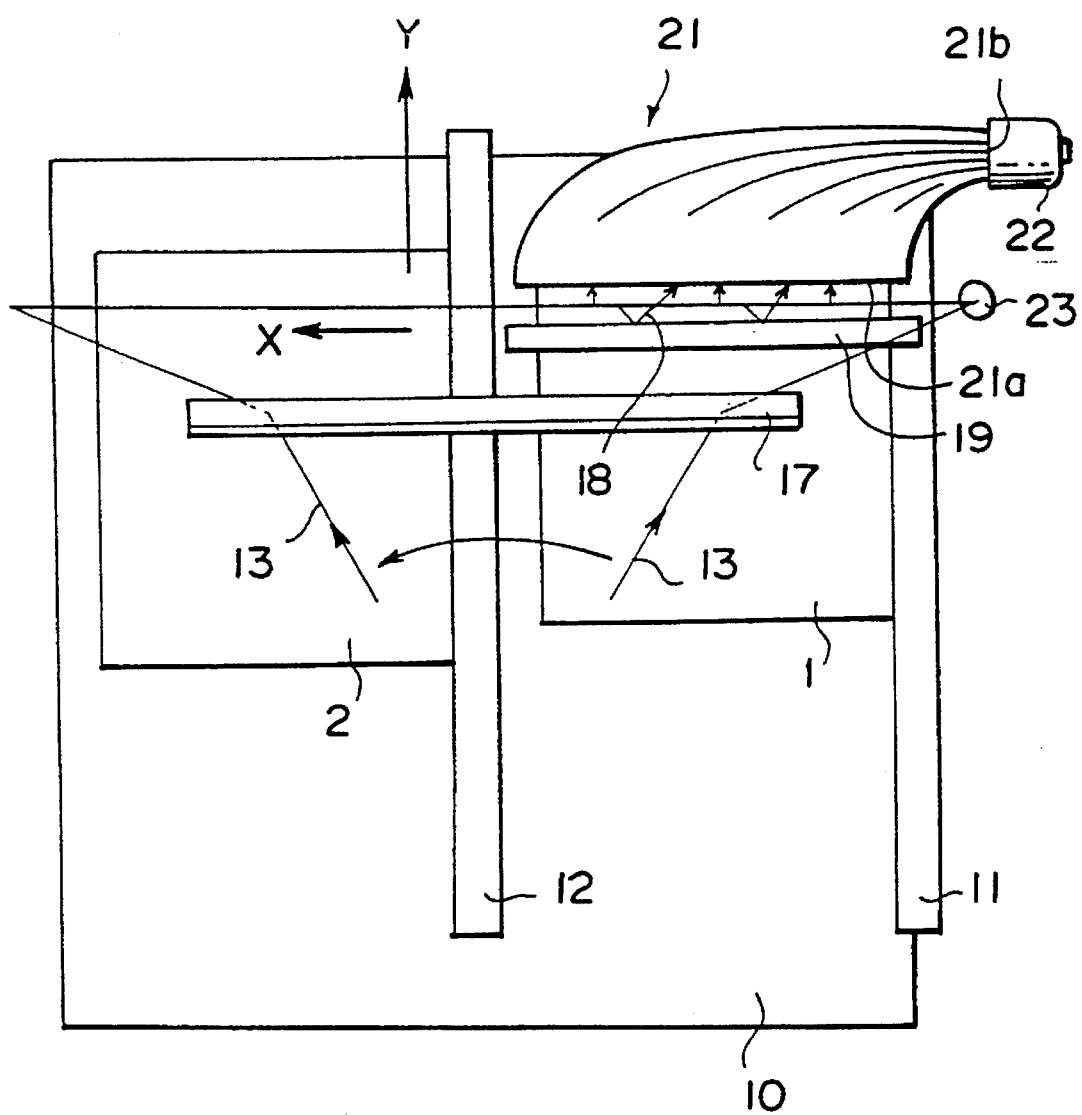

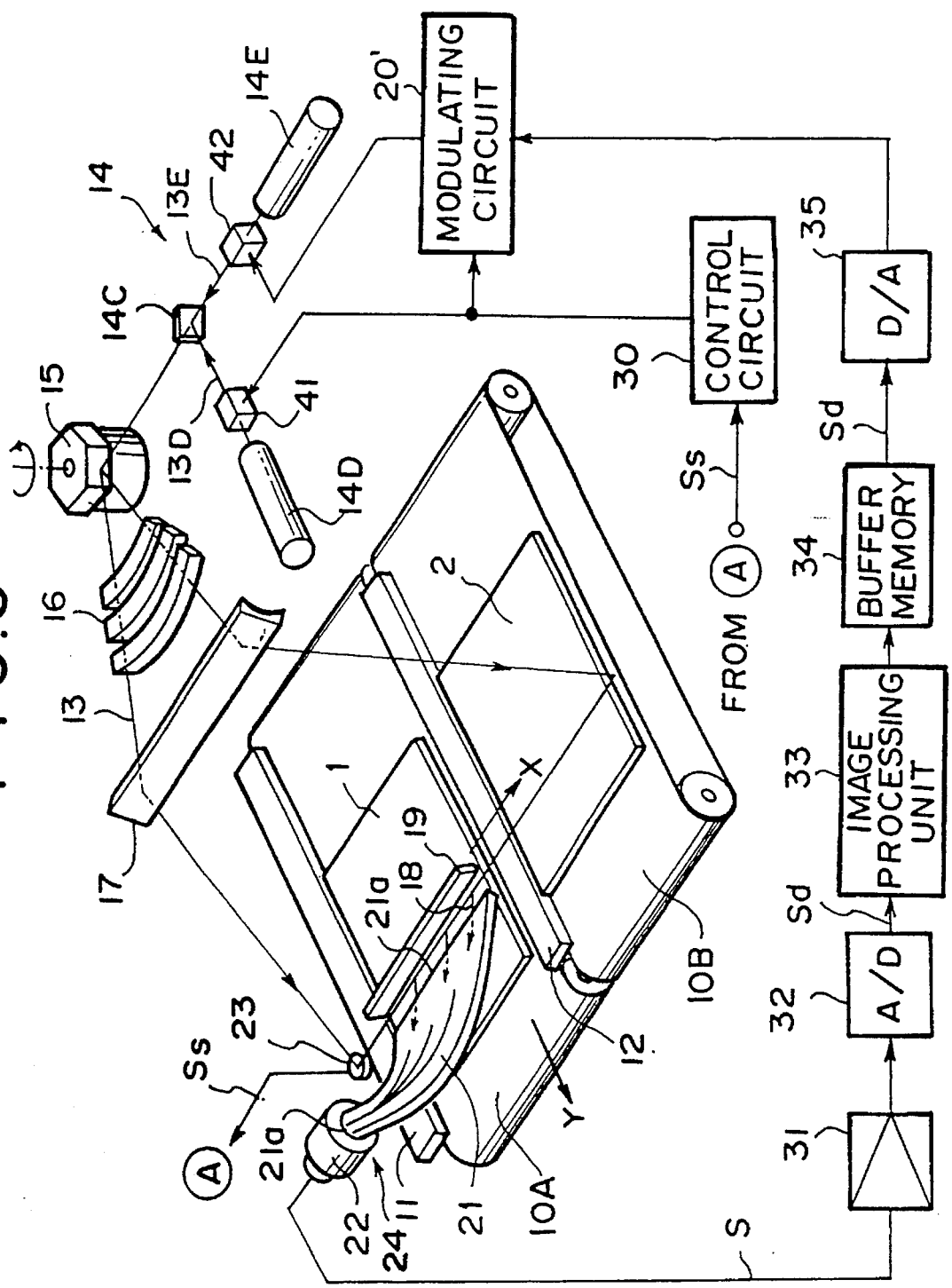

IMAGE READ-OUT AND REPRODUCING APPARATUS

BACKGROUND OF THE INVENTION

1. Field of the Invention

This invention relates to an image read-out and reproducing apparatus, wherein image information is read out from an image storage sheet, on which the image information has been recorded, by scanning the image storage sheet with a light beam, and an image is reproduced on a recording material by scanning the recording material with a modulated light beam. This invention particularly relates to an image read-out and reproducing apparatus, wherein an image read-out operation and an image reproducing operation can be carried out simultaneously.

2. Description of the Prior Art

Various light beam scanning read-out apparatuses have heretofore been used wherein an image storage sheet, on which image information has been recorded, is scanned two-dimensionally with a light beam which serves as reading light, light radiated out of the portion of the image storage sheet which portion has been exposed to the light beam (i.e. light which has been reflected from the exposed portion of the image storage sheet, light which has passed through the exposed portion of the image storage sheet, or light which has been emitted by the exposed portion of the image storage sheet) is photoelectrically detected, and the image information is thereby read out from the image storage sheet. Also, various light beam scanning recording apparatuses have heretofore been used wherein a light beam, which serves as reproducing light, is modulated in accordance with an image signal, a recording material (such as a photosensitive material or a heat-sensitive material) is scanned two-dimensionally with the modulated light beam, and an image represented by the image signal is thereby reproduced on the recording material.

Additionally, image read-out and reproducing apparatuses have been proposed which is provided with both the functions of a light beam scanning read-out apparatus and the functions of a light beam scanning recording apparatus and with which an image having been read out from an image storage sheet is reproduced on a recording material.

One example of such image read-out and reproducing apparatuses is disclosed in, for example, U.S. Pat. No. 4,789,782. The disclosed image read-out and reproducing apparatus is provided with a light beam scanning means for an image read-out operation and a light beam scanning means for an image reproducing operation such that the image read-out operation and the image reproducing operation may be carried out simultaneously. A different image read-out and reproducing apparatus is disclosed in, for example, U.S. Pat. No. 4,924,321. In the disclosed image read-out and reproducing apparatus, a single light beam scanning means is utilized for an image read-out operation and an image reproducing operation. An image read-out operation is carried out while an image reproducing operation is being ceased, and an image reproducing operation is carried out while an image read-out operation is being ceased.

With the former conventional image read-out and reproducing apparatus, the image read-out operation and the image reproducing operation can be carried out simultaneously. Therefore, the efficiency, with which the image read-out and reproducing operations are carried out, can be kept high. However, with the former conventional image read-out and reproducing apparatus, two expensive light beam scanning means must be used. Therefore, the cost of the image read-out and reproducing apparatus cannot be kept low.

With the latter conventional image read-out and reproducing apparatus, only a single light beam scanning means may be used. Therefore, the cost of the latter conventional image read-out and reproducing apparatus can be kept lower than the cost of the former conventional image read-out and reproducing apparatus. However, with the latter conventional image read-out and reproducing apparatus, the image read-out operation and the image reproducing operation cannot be carried out simultaneously. Therefore, the efficiency, with which the image read-out and reproducing operations are carried out, cannot be kept high.

SUMMARY OF THE INVENTION

The primary object of the present invention is to provide an image read-out and reproducing apparatus, with which images are read out and reproduced with a sufficiently high efficiency.

Another object of the present invention is to provide an image read-out and reproducing apparatus, which can be manufactured at a low cost.

The present invention provides an image read-out and reproducing apparatus which comprises:

i) a sub-scanning means for supporting an image storage sheet, on which image information has been recorded, and a recording material, on which an image is to be reproduced during its exposure to a light beam, such that said image storage sheet and said recording material may stand side by side with each other, said sub-scanning means conveying said image storage sheet and said recording material in the same direction or in directions opposite to each other, ii) a light source for producing a light beam, iii) a single main scanning means for causing said light beam, which has been produced by said light source, to scan said image storage sheet and said recording material in a direction, which is approximately normal to the direction or directions along which said image storage sheet and said recording material are conveyed, and with a scanning width that covers both said image storage sheet and said recording material, iv) a photoelectric detection means for detecting light, which is radiated out of a portion of said image storage sheet exposed to said light beam, an image signal representing the image information, which has been recorded on said image storage sheet, being thereby obtained, and v) a light modulating means for modulating said light beam in accordance with a predetermined image signal while said light beam is scanning said recording material.

With the image read-out and reproducing apparatus in accordance with the present invention, the image information, which has been recorded on the image storage sheet, is read out from the image storage sheet while the image storage sheet is being scanned with the light beam, which has been produced by the light source. Also, when the light beam goes beyond the image storage sheet and is scanning the recording material, the light beam is modulated in accordance with a predetermined image signal, and an image represented by the predetermined image signal is reproduced with the modulated image signal on the recording material.

In the image read-out and reproducing apparatus in accordance with the present invention, a single sub-scanning means may be utilized for both the image storage sheet and the recording material. Alternatively, two independent sub-scanning means may be utilized respectively for the image storage sheet and the recording material. In cases where a single sub-scanning means is utilized for both the image storage sheet and the recording material, the image storage sheet and the recording material are conveyed in the same direction. In cases where two independent sub-scanning means are utilized respectively for the image storage sheet and the recording material, the image storage sheet and the recording material may be conveyed in the same direction or in directions opposite to each other.

Also, with the image read-out and reproducing apparatus in accordance with the present invention, the image information which is being read out may be reproduced as a visible image in the real-time mode. Alternatively, the image signal detected from the image storage sheet may be stored in a storage means having a storage capacity corresponding to at least a single image. In such cases, after the image information recorded on a single image storage sheet has been read out completely, the detected image information may be reproduced as a visible image on the recording material. In such cases, while image information is being read out from an image storage sheet, a different image may be reproduced on a recording material. The image, which is thus reproduced on the recording material, may be other than those which are read out from image storage sheets.

As described above, with the image read-out and reproducing apparatus in accordance with the present invention, the image storage sheet and the recording material are located side by side with each other and conveyed in the sub-scanning direction. Also, the image storage sheet and the recording material are scanned with a single light beam. In this manner, the operation for reading out the image information from the image storage sheet and the operation for reproducing an image on the recording material can be carried out simultaneously. Therefore, the efficiency, with which the image read-out and reproducing operations are carried out, can be kept high.

Also, with the image read-out and reproducing apparatus in accordance with the present invention, a single main scanning means is utilized for both the image read-out operation and the image reproducing operation. In this manner, the number of main scanning means, which will require an expensive light deflector, or the like, and will be supplied at a high cost, is minimized. Additionally, a single sub-scanning means can be utilized for both the image read-out operation and the image reproducing operation. Therefore, the cost of the image read-out and reproducing apparatus in accordance with the present invention can be kept lower than an image read-out and reproducing apparatus, which is provided with a light beam scanning means for the image read-out operation and a light beam scanning means for the image reproducing operation.

BRIEF DESCRIPTION OF THE DRAWINGS

FIG. 1 is a schematic perspective view showing an embodiment of the image read-out and reproducing apparatus in accordance with the present invention, FIG. 2 is a partial plan view showing the embodiment of FIG. 1, and FIG. 3 is a schematic perspective view showing a different embodiment of the image read-out and reproducing apparatus in accordance with the present invention.

DESCRIPTION OF THE PREFERRED EMBODIMENTS

The present invention will hereinbelow be described in further detail with reference to the accompanying drawings.

FIG. 1 is a schematic perspective view showing an embodiment of the image read-out and reproducing apparatus in accordance with the present invention. FIG. 2 is a partial plan view showing the embodiment of FIG. 1. In this embodiment, a radiation image stored on a stimulable phosphor sheet 1, which is described in U.S. Pat. No. 4,789,782 or 4,924,321, is read out from the stimulable phosphor sheet 1. The radiation image is then reproduced as a photographic latent image on a photosensitive material 2. The stimulable phosphor sheet 1 has been exposed to radiation, which has passed through an object, and the radiation image of the object is thereby stored on the stimulable phosphor sheet 1.

As illustrated in FIGS. 1 and 2, this embodiment is provided with a conveyor belt 10, which serves as the sub-scanning means. The conveyor belt 10 supports the stimulable phosphor sheet 1, which serves as the image storage sheet, and the photosensitive material 2, which serves as the recording material, such that they stand side by side with each other. The conveyor belt 10 conveys the stimulable phosphor sheet 1 and the photosensitive material 2 at a predetermined speed and in the sub-scanning direction indicated by the arrow Y. This embodiment is also provided with a position adjusting member 11 and a position adjusting member 12, which adjust the positions of the stimulable phosphor sheet 1 and the photosensitive material 2 with respect to their width directions (i.e. with respect to the direction which is normal to the direction indicated by the arrow Y). This embodiment is additionally provided with a laser beam source 14, which is constituted of a semiconductor laser and produces a laser beam 13, and a light deflector 15, which reflects and deflects the laser beam 13 and which may be constituted of a rotating polygon mirror, or the like. This embodiment is further provided with a scanning lens 16, which may be constituted of an fθ lens. A cylindrical mirror 17 reflects the laser beam 13, which has been deflected by the light deflector 15 and has passed through the scanning lens 16, downwardly and converges the laser beam 13 on the stimulable phosphor sheet 1 and the photosensitive material 2. A photoelectric detection means 24 detects light 18, which is emitted by a portion of the stimulable phosphor sheet 1 when the portion is exposed to the laser beam 13. A modulating circuit 20 controls the laser beam source 14 and modulates the laser beam 13.

In this embodiment, the light deflector 15, the scanning lens 16 and the cylindrical mirror 17 constitute a main scanning means. Also, the photoelectric detection means 24 is constituted of a light guide member 21 and a photomultiplier 22. The light guide member 21 has a light input face 21a, which extends along a main scanning line of the laser beam 13 on the stimulable phosphor sheet 1 (the main scanning will be described later), and a light output face 21b, which is small and is located on the side opposite to the light input face 21a. The photomultiplier 22 is optically coupled with the light output face 21b.

A start point detecting sensor 23 is located on the extension of the main scanning line on the side outward from the effective main scanning region on the stimulable phosphor sheet 1. The start point detecting sensor 23 detects that the laser beam 13 has passed therethrough.

When the radiation image is to be read out from the stimulable phosphor sheet 1 and reproduced on the photosensitive material 2, the positions of the stimulable phosphor sheet 1 and the photosensitive material 2 are adjusted with respect to their width directions by the position adjusting member 11 and the position adjusting member 12. The stimulable phosphor sheet t and the photosensitive material 2 are thus placed on the conveyor belt 10. At this time, the photosensitive material 2 is located such that its leading end may be spaced a predetermined distance from the leading end of the stimulable phosphor sheet 1 to the rearward side with respect to the direction, along which the stimulable phosphor sheet 1 and the photosensitive material 2 are conveyed.

The laser beam 13 is deflected by the light deflector 15 such that it may scan the stimulable phosphor sheet 1 and the photosensitive material 2 in the main scanning direction indicated by the arrow X, which direction is approximately normal to the sub-scanning direction indicated by the arrow Y. The main scanning width is sufficiently large such that the stimulable phosphor sheet 1 and the photosensitive material 2 can be scanned over their whole widths. Also, the stimulable phosphor sheet 1 and the photosensitive material 2 are moved in the sub-scanning direction by the conveyor belt 10. In this manner, the stimulable phosphor sheet 1 and the photosensitive material 2 are scanned two-dimensionally with the laser beam 13.

Ordinarily, in order for the radiation image to be read out from the stimulable phosphor sheet 1, it is necessary for the stimulable phosphor sheet 1 to be scanned with a light beam having a higher energy level than when the radiation image is reproduced on the photosensitive material 2. Therefore, in this embodiment, the laser beam source 14 is constituted of a first semiconductor laser 14A, which is activated to produce a laser beam 13A only when the radiation image is read out from the stimulable phosphor sheet 1, and a second semiconductor laser 14B, which is activated to produce a laser beam 13B both when the radiation image is be read out from the stimulable phosphor sheet 1 and when the radiation image is reproduced on the photosensitive material 2. Such a combined laser beam source is described in, for example, U.S. Pat. No. 4,924,321.

When the laser beam 13B is produced by the second semiconductor laser 14B and passes over the start point detecting sensor 23 during the main scanning, the start point detecting sensor 23 detects that the laser beam 13B has passed therethrough. At this time, the start point detecting sensor 23 feeds a start point detection signal Ss into a control circuit 30. Upon receiving the start point detection signal Ss, the control circuit 30 operates the first semiconductor laser 14A for a predetermined period of time, during which the position that is being scanned in the main scanning direction falls in the recording region on the stimulable phosphor sheet 1. The laser beam 13A, which is produced by the first semiconductor laser 14A, is combined with the laser beam 13B by, for example, a beam splitter 14C. In this manner, while the laser beam 13 is scanning the recording region on the stimulable phosphor sheet 1, the energy level of the laser beam 13 is set to be sufficiently large such that the radiation image can be read out appropriately from the stimulable phosphor sheet 1.

When the stimulable phosphor sheet 1 is exposed to the laser beam 13, the exposed portion of the stimulable phosphor sheet 1 emits light 18 in proportion to the amount of energy stored thereon during its exposure to the radiation. The emitted light 18 impinges upon the light input face 21a of the light guide member 21 directly or after being reflected from a mirror 19. In this manner, the emitted light 18 enters the light guide member 21 from the light input face 21a. Thereafter, the emitted light 18 is guided inside of the light guide member 21 through repeated total reflection. The emitted light 18 then emanates from the light output face 21b of the light guide member 21 and is detected by the photomultiplier 22. The photomultiplier 22 generates an analog image signal S, which represents the amount of the emitted light 18, i.e. the radiation image stored on the stimulable phosphor sheet 1. The image signal S is amplified by an amplifier 31. Thereafter, the amplified image signal S is sampled and quantized by an A/D converter 32 with the timing which is synchronized with the two-dimensional scanning of the laser beam 13. In this manner, a digital image signal Sd, which has been divided into picture elements, is obtained from the A/D converter 32. The digital image signal Sd is then fed into an image processing unit 33, which carries out image processing (signal processing), such as gradation processing or frequency response processing, on the digital image signal Sd. The image signal Sd, which has been obtained from the image processing unit 33, is temporarily stored in a buffer memory 34.

The buffer memory 34 stores the image signal Sd in units of the image signal components corresponding to, for example, several main scanning lines. The image signal components of the image signal Sd are sequentially read from the buffer memory 34 with predetermined timing. The image signal Sd, which has thus been read from the buffer memory 34, is converted by a D/A converter 35 into an analog image signal. The analog image signal is then fed into the modulating circuit 20. The modulating circuit 20 controls the second semiconductor laser 14B. The laser beam 13B, which is produced by the second semiconductor laser 14B, is thus directly modulated in accordance with the image signal Sd. The control circuit 20 matches the timing of the modulation to the period during which the laser beam 13 scans the photosensitive material 2 in the main scanning direction. During this period, the laser beam 13 is constituted only of the modulated laser beam 13B. Therefore, the image represented by the image signal Sd, i.e. the radiation image which was stored on the stimulable phosphor sheet 1, is reproduced as a photographic latent image on the photosensitive material 2.

As described above, the operation for reading out the radiation image from the stimulable phosphor sheet 1 and the operation for reproducing the radiation image on the photosensitive material 2 are carried out alternately during a single main scanning period. In this manner, the image read-out operation and the image reproducing operation are carried out simultaneously. Therefore, the efficiency, with which the image read-out operation and the image reproducing operation are carried out, can be kept high.

When the image read-out operation and the image reproducing operation have been finished, the conveyor belt 10 discharges the stimulable phosphor sheet 1 and the photosensitive material 2 from the position that is exposed to the laser beam 13. Thereafter, the photosensitive material 2 is fed into a known developing machine (not shown). In the developing machine, the photographic latent image reproduced on the photosensitive material 2 is developed.

In the embodiment described above, the radiation image, which has been read out from the stimulable phosphor sheet 1, is immediately reproduced on the photosensitive material 2. Alternatively, the image read-out operations from a plurality of stimulable phosphor sheets 1, 1, . . . may be carried out continuously. Image signals Sd, Sd, . . . , which have thus been detected from the plurality of the stimulable phosphor sheets 1, 1, . . . , may be stored in an image memory having a large storage capacity. Thereafter, the radiation images represented by the image signals Sd, Sd, may be reproduced sequentially on photosensitive materials 2, 2, . . . In such cases, while a radiation image is being read out from a stimulable phosphor sheet 1, a different image can be reproduced on a photosensitive material 2. Therefore, the efficiency, with which the image read-out operation and the image reproducing operation are carried out, can be kept high.

In some cases, because of the characteristics of the stimulable phosphor sheet 1 and the photosensitive material 2, or the like, it is desirable that the reading light and the reproducing light have different wavelengths. In such cases, semiconductor lasers, which produce the laser beam 13A and the laser beam 13B having different wavelengths, may be utilized as the first semiconductor laser 14A and the second semiconductor laser 14B. During the period during which the stimulable phosphor sheet 1 is scanned in the main scanning direction, only the first semiconductor laser 14A may be operated. During the period during which the photosensitive material 2 is scanned in the main scanning direction, only the second semiconductor laser 14B may be operated.

In cases where no limitation is imposed on the wavelengths of the reading light and the reproducing light, and the reading light and the reproducing light may have the same level of intensity, only a single light source may be employed. Also, in cases where no limitation is imposed on the wavelengths of the reading light and the reproducing light, and the reading light and the reproducing light should have different levels of intensity, only a single light source may be employed such that the intensity of the light beam produced by the light source may be changed between when an image storage sheet is scanned in the main scanning direction and when a recording material is scanned in the main scanning direction.

A different embodiment of the image read-out and reproducing apparatus in accordance with the present invention will be described hereinbelow with reference to FIG. 3. In FIG. 3, similar elements are numbered with the same reference numerals with respect to FIG. 1. In this embodiment, a laser beam source 14 is composed of a first He-Ne laser 14D and a second He-Ne laser 14E. A laser beam 13D, which has been produced by the first He-Ne laser 14D, passes through a first acousto-optic modulator 41 (a first AOM). A laser beam 13E, which has been produced by the second He-Ne laser 14E, passes through a second AOM 42.

The second He-Ne laser 14E is operated during the image read-out period and the image reproducing period. During the image reproducing period, the second AOM 42 is operated by a modulating circuit 20°, and the laser beam 13E is thus modulated in accordance with an image signal Sd. During the image read-out period, the second AOM 42 allows the laser beam 13E to pass therethrough without modulating it. The first AOM 41 is operated by the control circuit 30 such that it may allow the laser beam 13D to pass therethrough during the image read-out period, and it may block the laser beam 13D during the image reproducing period.

In the embodiment of FIG. 3, the operation for reading out the radiation image from the stimulable phosphor sheet 1 and the operation for reproducing the radiation image on the photosensitive material 2 are carried out alternately during a single main scanning period. In this manner, the image read-out operation and the image reproducing operation are carried out simultaneously. Therefore, the efficiency, with which the image read-out operation and the image reproducing operation are carried out, can be kept high.

In this embodiment, a conveyor belt 10A conveys the stimulable phosphor sheet 1, and a conveyor belt 10B conveys the photosensitive material 2. The conveyor belt 10A and the conveyor belt 10B convey the stimulable phosphor sheet 1 and the photosensitive material 2 in the same direction, i.e. in the direction indicated by the arrow Y. Alternatively, as described above, the conveyor belt 10A and the conveyor belt 10B may convey the stimulable phosphor sheet 1 and the photosensitive material 2 in opposite directions. Also, when the He-Ne laser beams are used in the manner described above, as in the cases where the semiconductor laser beams are used, only a single light source may be employed depending on the conditions concerning the levels of intensity and the wavelengths of the reading light and the reproducing light. As another alternative, different light sources, such as a He-Ne laser and a semiconductor laser, may be combined with each other. As a further alternative, three or more light sources may be utilized in combination with each other such that a light beam having a high level of intensity may be obtained.

In the aforesaid embodiments of the image read-out and reproducing apparatus in accordance with the present invention, a radiation image is read out from a stimulable phosphor sheet. However, the image read-out and reproducing apparatus in accordance with the present invention is also applicable when a light beam is irradiated to an image storage sheet on which an image has been recorded, light which has been reflected by the image storage sheet or has passed through the image storage sheet is detected, and the image is thereby read out from the image storage sheet. The image read-out and reproducing apparatus in accordance with the present invention is further applicable when light is irradiated to a heat-sensitive material, and an image is thereby reproduced on the heat-sensitive material.

What is claimed is:

1. An image read-out and reproducing apparatus which comprises:

i) a sub-scanning means for supporting an image storage sheet, on which image information has been recorded, and a recording material, on which an image is to be reproduced during its exposure to a light beam, such that said image storage sheet and said recording material stand side by side with each other and in the same plane, said sub-scanning means conveying said image storage sheet and said recording material in the same direction or in directions opposite to each other, ii) a light source for producing a light beam, iii) a single main scanning means for causing said light beam, which has been produced by said light source, to scan said image storage sheet and said recording material in a direction, which is approximately normal to the direction or directions along which said image storage sheet and said recording material are conveyed, and with a scanning width that extends across both said image storage sheet and said recording material in a single scan, iv) a photoelectric detection means for detecting light, which is radiated out of a portion of said image storage sheet exposed to said light beam, an image signal representing the image information, which has been recorded on said image storage sheet, being thereby obtained, and v) a light modulating means for modulating said light beam in accordance with a predetermined image signal while said light beam is scanning said recording material.

2. An apparatus as defined in claim 1 wherein said sub-scanning means is a single sub-scanning device utilized for both said image storage sheet and said recording material.

3. An apparatus as defined in claim 1 wherein said sub-scanning means is two independent sub-scanning devices, utilized respectively for said image storage sheet and said recording material.

4. An apparatus as defined in claim 1 wherein the image information which is being read out is reproduced as a visible image in the real-time mode.

5. An apparatus as defined in claim 1 wherein, after the image information recorded on a single image storage sheet has been read out completely, the detected image information is reproduced as a visible image on a recording material.

6. An apparatus as defined in claim 1 wherein said image information represents a radiation image.

7. An apparatus as defined in claim 6 wherein said image storage sheet is a stimulable phosphor sheet on which a radiation image has been stored.

8. An apparatus as defined in claim 7 wherein said light beam, with which said image storage sheet is scanned, serves as stimulating rays, which cause said stimulable phosphor sheet to emit light in proportion to the amount of energy stored thereon during its exposure to radiation, and said photoelectric detection means detects the emitted light.

9. An apparatus as defined in claim 1 wherein said light beam is a laser beam.

10. An apparatus as defined in claim 1 wherein said recording material is a photosensitive material.

11. An apparatus as defined in claim 1 wherein said recording material is a heat-sensitive material.

12. An image read-out and reproducing apparatus comprising:

sub-scanning means for supporting an image storage sheet, on which image information has been recorded, and a recording material, on which an image is to be reproduced during its exposure to a light beam, such that said image storage sheet and said recording material stand side by side with each other, said sub-scanning means comprising two independent sub-scanning devices respectively utilized for said image storage sheet and said recording material and conveying said image storage sheet and said recording material in the same direction or in directions opposite to each other, a light source for producing a light beam, one individual main scanning means for causing said light beam, which has been produced by said light source, to scan said image storage sheet and said recording material in a direction, which is approximately normal to the direction or directions along which said image storage sheet and said recording material are conveyed, and with a scanning width that covers both said image storage sheet and said recording material, a photoelectric detection means for detecting light, which is radiated out of a portion of said image storage sheet exposed to said light beam, an image signal representing the image information, which has been recorded on said image storage sheet, being thereby obtained, and light modulating means for modulating said light beam in accordance with a predetermined image signal while said light beam is scanning said recording material.

* * * * *